United States Patent [19]

Gruber et al.

[11] Patent Number: 4,491,029

[45] Date of Patent: Jan. 1, 1985

[54] POSITION GYROSCOPE

[75] Inventors: Ernst Gruber, Munich; Wolfgang von Hoessle, Ottobrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 376,202

[22] Filed: May 7, 1982

[30] Foreign Application Priority Data

May 20, 1981 [DE] Fed. Rep. of Germany ....... 3120022

[51] Int. Cl.³ .................... G01C 19/26; G01C 19/30
[52] U.S. Cl. .................................... 74/5.1; 74/5.4; 74/5.47; 74/5.6 D
[58] Field of Search .............. 74/5.4, 5.6 D, 5.47, 74/5.1, 5.12; 244/3.2, 3.21; 73/505, 504

[56] References Cited

U.S. PATENT DOCUMENTS

| 2,595,951 | 5/1952 | Konet et al. | 74/5.6 D X |
| 2,786,356 | 3/1957 | Klose | 74/5.1 |
| 3,010,676 | 11/1961 | Shelley | 244/3.2 |
| 3,269,195 | 8/1966 | Cahoon et al. | 74/5.4 |
| 3,570,282 | 3/1971 | Knopp et al. | 74/5.12 |

FOREIGN PATENT DOCUMENTS 1222274 8/1966 Fed. Rep. of Germany.
1623359 1/1971 Fed. Rep. of Germany.
2501931 9/1975 Fed. Rep. of Germany.
2330998 6/1977 France ........................ 74/5.12

Primary Examiner—Rodney H. Bonck
Attorney, Agent, or Firm—W. G. Fasse; D. H. Kane, Jr.

[57] ABSTRACT

The present positional gyroscope is used for stabilizing and steering a flying body, especially a secondary flying body ejected from a primary or carrier flying body which is rotating or rolling about its longitudinal or roll axis. Such gyroscopes are supposed to sense and take over the rolling position information from the gyroscope of the carrier flying body. For this purpose it is necessary that the gyroscope of the secondary flying body avoids course deviations. Hence, the gyroscope is supported in a first locked frame (3, 8) which in turn is suspended in an auxiliary rolling frame (4). A drive mechanism or motor (2) is connected to the rolling frame (4). The driving motor (2) may be switched on for rotating the auxiliary rolling frame (4) prior to activating or ejecting the secondary flying body. The auxiliary rolling frame (4) will be made to rotate in a direction opposite to the rolling direction of the carrier flying body for providing a fixed reference for the steering or stabilizing of the secondary flying body. The same type of gyroscope may also be used in the carrier flying body, whereby the gyroscope is made independent of the rolling motion of the carrier flying body.

4 Claims, 1 Drawing Figure

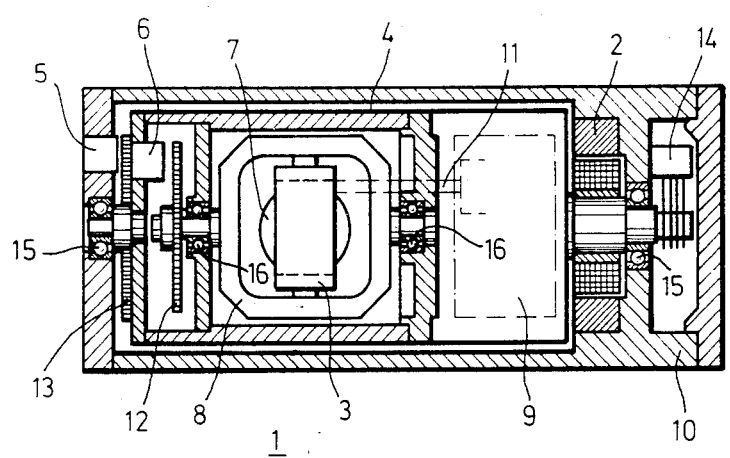

POSITION GYROSCOPE

CLAIM TO PRIORITY

The present application is based on German Ser. No. P 31 20 022.2, filed in the Federal Republic of Germany on May 20, 1981. The priority of the German filing date is claimed for the present application.

BACKGROUND OF THE INVENTION

The present invention relates to a gyroscope for measuring the rolling position and steering of flying bodies in response to a sensed rolling position. More specifically, the invention relates to a gyroscope which is generally suitable for primary and secondary flying bodies. A primary flying body in this context is a flying body which carries a secondary flying body to be ejected or launched from the primary flying body. The present gyroscope is especially suitable for use in a secondary flying body which is ejected from a rolling carrier or primary flying body.

The use of such rolling positional gyroscopes for providing a reference value in the guidance and stabilizing of flying bodies is well known. Reference is made in this connection to German patent publications(DE-OS) No. 1,623,359; (DE-AS) No. 1,222,274; and (DE-OS) No. 2,501,931. These prior art structures customarily comprise a gyroscope supported by universal joint or gimbal means and brought to its rated r.p.m. by means of a pressurized gas charge. The pressurized gas blows against the gyro rotor through a nozzle.

The use of this type of gyro in so-called subflying bodies or secondary flying bodies which are ejected from primary or carrier flying bodies, has encountered certain problems. Where the primary or carrier flying body is of the nonrolling type, no problems have been encountered in the transfer of the rolling position representing information from one positional gyro in the carrier flying body to the positional gyro in the secondary or subflying body. However, when the primary or carrier flying body is of the rolling type, it is not possible to activate the positional gyro normally equipped with lockable frames, without a follow-up mechanism because the frames cannot be unlocked simultaneously which causes an unlocking error. Positional gyros or gyroscopes equipped with a lockable frame are also known as so-called three-positional gyros (please see U.S. Pat. No. 3,570,282, issued Mar. 16, 1971, wherein a nozzle tube for causing a rotor to spin also functions as a releasable gimbal frame locking and unlocking means).

To avoid the just outlined problem it is conceivable to use a positional gyro having an outer frame which is not locked. However, it would appear that the drive of the gyro rotor in such an instance would be rather complex. Further, in such a structure without a locked outer frame it is not possible to avoid course deviations of the inner frame of the positional gyro during the activation of the rotor unless expensive preventive measures are taken. Without such expensive preventive measures there is no guarantee that the spinning axis is aligned orthogonalle the roll axis of the secondary flying body. Such alignment is required due to the large yawing angle motions of the secondary flying body. Furthermore, in such a structure it would not be known in what axial position the gyro was started. Therefore, no fixed reference point would be available.

Another way of solving the above mentioned problem could be visualized in activating the positional gyro in the secondary flying bodies already prior to starting the primary or carrier flying body. However, in such a solution the positional accuracy can be satisfied only with relatively expensive equipment due to the long flying time and due to the rolling of the carrier flying body. Under certain circumstances the positional accuracy can be assured only with so-called slave type gyroscopes which have a substantial volume and are therefore not quite suitable for use in the limited space available in such flying bodies.

OBJECTS OF THE INVENTION

In view of the above it is the aim of the invention to achieve the following objects singly or in combination:

to provide a rolling positional gyro capable of taking over or sensing the rolling positional information with minimal structural costs;

to activate a positional gyro having a locked or lockable frame in a rolling flying body system; and to provide a positional gyroscope which is suitable not only in the secondary or subflying body, but also in the primary or carrier flying body, especially in view of the high rolling frequency or r.p.m. of the carrier flying body.

SUMMARY OF THE INVENTION

According to the invention there is provided a positional gyro for stabilizing and steering a flying body, which gyroscope is characterized in that it is equipped with a lockable frame and with an additional rolling frame driven by a separate drive means which may be activated or energized even prior to the ejection of the flying body and in a rotational direction opposite to the rotational direction of the rolling of a primary or carrier flying body.

It is a substantial advantage of the present invention that the costs for the additional rolling frame are minimal and so are the structural features of such an additional rolling frame. Another advantage is seen in that conventional gyro components may be employed in a gyroscope improved according to the invention for the transfer of the rolling position information from one flying body to the other, especially from the carrier flying body to the sub or secondary flying body ejected from the carrier flying body. The features according to the invention make it possible to activate a positional gyro having a lockable frame in a rolling flying system.

BRIEF FIGURE DESCRIPTION

In order that the invention may be clearly understood, it will now be described, by way of example, with reference to the single FIGURE of the accompanying drawings which shows a longitudinal, axial sectional view through a positional gyroscope according to the invention.

DETAILED DESCRIPTION OF A PREFERRED EXAMPLE EMBODIMENT AND OF THE BEST MODE OF THE INVENTION

The positional gyro 1 comprises an outer housing 10. A drive mechanism 2 is mounted in the housing 10 as shown. The drive mechanism 2 drives a first rolling frame 4 according to the invention as will be described in more detail below. The drive mechanism 2 may, for example, comprise a separate electric motor of a d.c. type. A stepping motor may also be suitable or it may be a frequency controlled asynchronous motor. However, the purposes of the invention may also be achieved by using a pyrotechnical gas generator of conventional construction for driving the first rolling frame 4 according to the invention.

The gyro or rotor 7 is mounted for rotation in the first rolling frame 4 by an inner frame or gimbal cage 3 and an outer second rolling frame or gimbal 8 supported in the first rolling frame 4 by bearings 16. A pyrotechnical gas generator 9 is also supported in the rolling frame 4 for driving the rotor 7 of the gyro through a gas conduit 11 in a conventional manner, whereby the gas conduit 11, as long as it remains in its dashed line position shown in the FIGURE, passes through the frames 4 and 8 and through the gimbal cage 3 to thereby lock these frames and cage against rotation as is also conventional in accordance with the above mentioned U.S. Pat. No. 3,570,282. . The rolling frame 4 in turn is supported for rotation in the housing 10 by means of bearings 15 as shown. As seen in the FIGURE, the bearings 15 and 16 are so located that the first and second rolling frames 4 and 8 have a common, coaxial rotational axis. First digital incremental pick-up means 5, 13 are arranged for interaction between the rolling frame 4 and an information source outside the housing 10. Second digital incremental pick-up means 6 and 12 are arranged for an information exchange between the rolling frame 4 and the outer gyro frame or gimbal 8. The first and second pick-up means comprise conventional tab components or elements 5 and 6 as well as raster disks 12 and 13, whereby the raster disk 12 fastened on the outer frame or gimbal 8 of the gyro and whereby the raster disk 13 rotates with the rolling frame 4. For this purpose the disk 12 is supported by the left-hand bearing 16 of the gimbal 8 and the raster disk 13 is rigidly secured to the rolling frame 4 adjacent to the left-hand bearing 15 thereof.

The housing 10 is further provided with a chamber at its right-hand end in which there is mounted a slip ring transmitter 14 operatively connected to the digital incremental tab 6. Signals for controlling and igniting the pyrotechnical gas generator 9 and for energizing the drive means 2 may also be supplied through the slip ring transmitter 14.

As shown in the figure, the positional gyro 1 is mountable in a secondary flying body with its housing 10 and the lockable frame means 3, 8 are supported in the additional rolling frame 4 according to the invention. The additional rolling frame 4 is driven with the aid of the drive motor 2 prior to activating the positional gyro 1, whereby the direction of rotation of the rolling frame 4 is opposite to that of the primary or carrier flying body.

The rotation of the rolling frame 4 is synchronized relative to a definite position in a fixed ground or earth coordinate system. This synchronization is accomplished with the aid of the positional gyroscope of the carrier flying body through the digital, incremental pick-up means 5, 13 which provide a connection between the carrier flying body not shown and the rolling frame 4.

In order to achieve the required high angular resolution for the rolling position of the secondary flying body which is normally nonrolling the two simple digital, incremental tabs 5 and 6 are used. For this purpose the driving of the rolling frame 4 is continued with a suitable optimal r.p.m. after the subflying body or secondary flying body has been ejected from the carrier flying body.

Furthermore, due to the simultaneous utilization of the above described structural components the invention avoids that the nonrolling secondary flying body requires a high resolution digital pick-up for the gyro. Such high resolution digital pick-ups are very expensive. The invention also avoids the need for an analog pick-up. Avoiding an analog pick-up has the further advantage that according to the invention it is not necessary to block or stop the outer additional rolling frame 4 in a very precisely defined position relative to the secondary flying body after the latter has been ejected from its carrier flying body.

The transmission of digital information from the digital incremental pick-up element or member 6 does not pose any problem because it is not necessary that the rotational axle of the rolling frame 4 which is driven by the motor 2, is supported by low friction type bearing means.

Due to the large variations in the yawing angle of the secondary flying body on its flight path to a target, it is further desirable or suitable that the spinning or rotating axis of the positional gyroscope of the secondary flying body is aligned horizontally because the universal joint frame or gimbals of conventional gyroscope constructions are limited in the angle which they permit to occur in the yawing motion.

The invention has been described primarily with reference to use of the present type of gyroscope in a secondary flying body. However, the invention is quite useful also for use in the carrier flying body due to the high rolling frequency or r.p.m. of the primary or carrier flying body. Due to the auxiliary rolling frame 4 as disclosed herein and due to the fact that this auxiliary rolling frame is driven by the motor 2 it is possible to decouple the positional gyro of the carrier flying body from its rolling motion, whereby the guidance precision is increased. This is especially advantageous because due to the high launching acceleration it is not possible to increase the gyroscopic masses to any desired extent for improving the guidance precision. In other words, the invention avoids increasing the guidance precision by increasing the angular momentum of the gyro.

Although the invention has been described with reference to specific example embodiments, it will be appreciated, that it is intended to cover all modifications and equivalents within the scope of the appended claims.

What is claimed is:

1. A position gyroscope for sensing a rolling position of a flying body, comprising housing means (10) operatively mounted in said flying body, a first rolling frame (4), first bearing means (15) for rotatably mounting said first rolling frame in said housing means (10), a second rolling frame (8), second bearing means (16) for rotatably mounting said second rolling frame (8) in said first rolling frame (4) so that the first and second rolling frames have a common coaxial rotational axis, a gimbal cage (3) operatively mounted in said second rolling frame (8), means (11) operatively positioned for unlocking and locking said gimbal cage (3) and said second rolling frame (8) against rotation, a gyro rotor (7) operatively mounted in said gimbal cage (3), first pick-up means (5, 13) operatively interposed between said housing means (10) and said first rolling frame (4) for ascertaining any relative rotation between said housing means (10) and said first rolling frame (4), second pick-up means (6, 12) operatively interposed between said first and second rolling frame (4, 8) for ascertaining any relative rotation between said first and second rolling frames (4, 8) having said common rotational axis, and drive means (2) supported in said housing means (10) and operatively connected to said first rolling frame (4) for positively driving said first rolling frame (4) in a desired rotational direction which is opposite to any rolling motion of said flying body and thus opposite to any rolling motion of said housing means (10) for compensating said rolling motion of the flying body by the counter-rotation of said first rolling frame (4), whereby said gyro rotor (7), said gimbal cage (3), and said second rolling frame (8) are free of any rolling motions during an unlocking of said gimbal cage (3) and of said second rolling frame (8).

2. The position gyroscope of claim 1, installed in a secondary flying body launched from a primary carrier flying body rolling in a given rotational direction, wherein said drive means (2) are arranged for rotating said first rolling frame (4) in a direction opposite to said rotational rolling direction of said carrier flying body for preventing said rolling of said carrier flying body from influencing the secondary flying body.

3. The position gyroscope of claim 1, wherein said first pick-up means comprise first digital incremental pick-up members (5, 13) including a digital pick-up member (5) extending through said housing means (10) and a digital pick-up member (13) operatively connected to said first rolling frame (4) for rotating with said first rolling frame (4), said digital pick-up members (5 and 13) sensing relative rotation between said first rolling frame (4) and said housing means (10), said first digital incremental pick-up members (5 and 13) being arranged for synchronizing the rotation of said first rolling frame (4) by said drive means (2) in a direction opposite to a rolling direction of a primary carrier flying body with the aid of a position gyro of the primary carrier flying body.

4. The positional gyroscope of claim 1, wherein said second pick-up means comprise second digital incremental pick-up elements (6, 12) including a digital pick-up element (6) extending through said first rolling frame (4) for rotating with said first rolling frame (4) and a digital pick-up element (12) operatively connected to said second rolling frame (8) for rotating with said second rolling frame (8), said digital pick-up elements (6 and 12) ascertaining any relative rotation between said first and second rolling frames (4, 8).

* * * * *